(12) United States Patent
Alavian

(10) Patent No.: US 9,654,610 B1
(45) Date of Patent: May 16, 2017

(54) WAVE-SHAPING ASSEMBLY FOR SPEAKER AND MICROPHONE PERFORMANCE ENHANCEMENT IN MOBILE COMPUTING, TELEPHONY, AND OTHER ELECTRONIC DEVICES

(71) Applicant: Alireza Alavian, Mission Viejo, CA (US)

(72) Inventor: Alireza Alavian, Mission Viejo, CA (US)

( * ) Notice: Subject to any disclaimer, the term of this patent is extended or adjusted under 35 U.S.C. 154(b) by 0 days.

(21) Appl. No.: 15/243,506

(22) Filed: Aug. 22, 2016

(51) Int. Cl.
*H04B 1/38* (2015.01)
*H04M 1/03* (2006.01)
*H04M 1/02* (2006.01)
*H04R 1/34* (2006.01)

(52) U.S. Cl.
CPC ......... *H04M 1/035* (2013.01); *H04M 1/0237* (2013.01); *H04R 1/34* (2013.01); *H04R 2499/11* (2013.01)

(58) Field of Classification Search
CPC ........................... H04M 1/035; H04M 1/0237

USPC ................................. 455/570, 575.1, 90.2
See application file for complete search history.

(56) References Cited

U.S. PATENT DOCUMENTS

| | | | | |
|---|---|---|---|---|
| 8,086,285 B2 * | 12/2011 | McNamara | .......... | H04B 1/3888 379/426 |
| 2007/0223745 A1 * | 9/2007 | Feng | .......... | H04M 1/04 381/160 |

* cited by examiner

*Primary Examiner* — April G Gonzales
(74) *Attorney, Agent, or Firm* — LAZARIS IP

(57) ABSTRACT

An assembly for mobile electronic devices enhances audio by shaping the direction of emitted waves. Such a wave-shaping assembly is retractable so as to be flush or nearly flush with a surface of a mobile electronic device, and is extendable for playing audio to a listener more than a certain distance away from the mobile device. The wave-shaping assembly is suitable for voice, music, and other audible sound effects. The length and width of the extension of the wave-shaping assembly is variable, depending on the application and the industrial design of the mobile electronic device. The wave-shaping assembly is included either as a feature at time of manufacture, or as an added, optional attachment to a mobile electronic device.

20 Claims, 5 Drawing Sheets

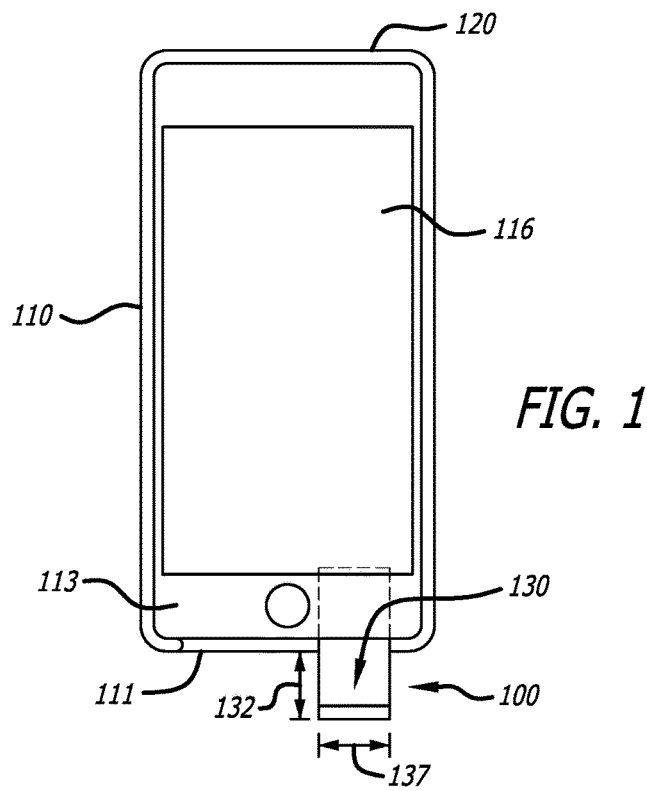
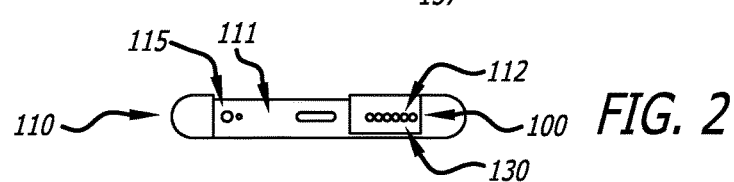
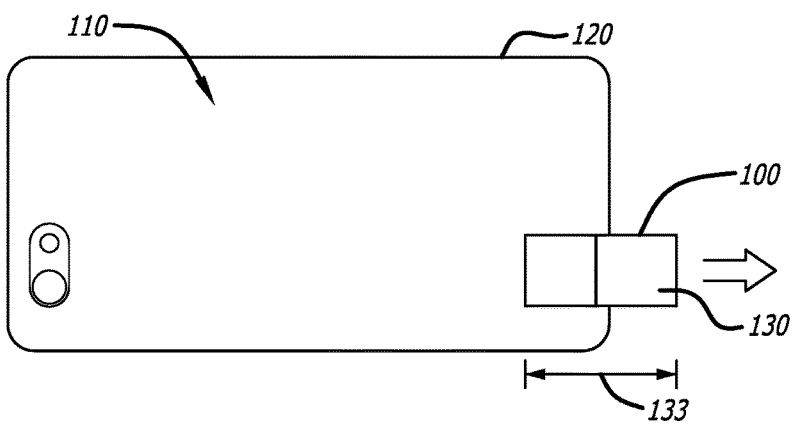
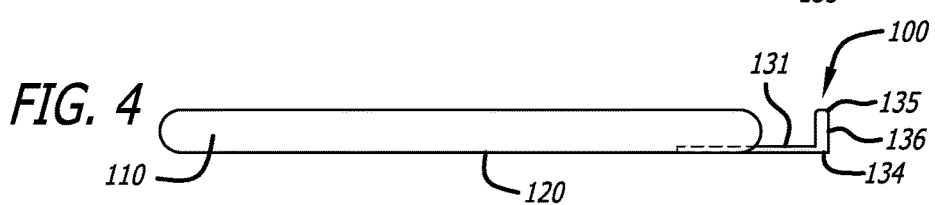

WAVE-SHAPING ASSEMBLY FOR SPEAKER AND MICROPHONE PERFORMANCE ENHANCEMENT IN MOBILE COMPUTING, TELEPHONY, AND OTHER ELECTRONIC DEVICES

CROSS-REFERENCE TO RELATED APPLICATION(S)

Not applicable.

FIELD OF THE INVENTION

The present invention relates to performance of audio components in mobile electronic devices. Specifically, the present invention relates to shaping of audio waves for improvements in directing sound emitted by speakers from such devices, and for capturing audio waves for microphones in such devices, in an assembly and apparatus that forms an intrinsic part of, or an added attachment, to devices such as mobile phones, wearable computers, personal health monitors, personal fitness trackers, portable computers, portable readers, portable gaming devices, portable media players, and the like.

BACKGROUND OF THE INVENTION

In most mobile electronic devices, the performance of many elements is comprised to achieve a desirable industrial design. This includes diminished or even minimal audio performance in components such as speakers and microphones.

Speaker components in mobile electronic devices, such as mobile phones, portable or tablet computers, and portable e-readers, gaming devices, and media players are seldom more than a 2 cm diameter, and usually are much smaller, due to space limitations in the design of the overall product. Sound is ported through a minimal opening in an enclosure or housing of the mobile electronic device, often with a convoluted or difficult path. The result is less than desirable audio performance in a mobile electronic device, often causing frustration and annoyance to users and listeners.

Also, speakers and microphones on mobile electronic devices are generally positioned either on sides or on the back of these products. Where a screen is included, that takes up the general front portion of mobile devices, and in order to better hear or direct one's voice to the phone, one must generally tilt the phone so that the sound can be better heard or to be able to speak more easily into the mobile electronic device. However, by doing so, the screen is then generally at an angle which doesn't allow for it to be easily viewed by the user.

Accordingly, there is a need in the existing art for an approach to enhancing the operation of speakers and microphones in mobile electronic devices

BRIEF SUMMARY OF THE INVENTION

Accordingly, it is one objective of the present invention to provide a wave-shaping assembly for use with mobile electronic devices. It is another objective of the present invention to provide an approach for shaping waves emitted by, and directed to, mobile electronic devices for improving audio performance. It is still another objective of the present invention to provide a wave-shaping assembly that re-directs sound waves along a reflective surface of a slide-out apparatus that is configured as part of either a mobile electronic device itself, as an accessory for a mobile electronic device, or as part of a case that houses a mobile electronic device. It is a further objective of the present invention to provide one or more cavities configured as part of a case for a mobile electronic device for directing sound waves along a channel therein.

The present invention is an apparatus for enhancement of audio performance in mobile electronic devices. The present invention is comprised of a wave-shaping assembly that includes several components which, in various embodiments, re-direct sound waves in a specific direction relative to a mobile electronic device. The present invention may either be part of the electronic mobile device itself as manufactured, or may be provided as part of an accessory, such as an external case that is capable of use with the mobile electronic device for protection, aesthetics, or addition of further features. The present invention may also be configured as an attachment to either a mobile electronic device, or to an accessory therefor.

In one embodiment, when in use, the wave-shaping assembly is extendable to a certain distance away from the mobile electronic device to act as a reflector of audio waves, concentrating them in the desired area or direction for improved audio performance. When not needed, the wave-shaping assembly is retractable into the mobile electronic device when built as an intrinsic part, or into an attachment to the mobile electronic device when provided as an accessory (or to the device itself, when provided as a modular component therefor). In another embodiment, the wave-shaping assembly is formed as at least one permanent channel, tunnel, cavity, or other opening in an accessory for a mobile electronic device.

The present invention allows for sound emitted from mobile electronic devices to be more efficiently directed to the listener, while still allowing the listener to operate or view a screen without having to angle the device towards the ear to hear the sound more directly. The present invention may extend, slide, extrude, pop-out, unfold, detach (and reattach), reshape, or pull-out of a protective or esthetically-enhancing cases, or include a combination of these, depending on the design and material of the case. Depending on the location of a microphone and speakers on the mobile electronic device, the present invention may be incorporated as a combined movement or, if need be, the case may hold a combination of functions at separate locations therein to pull-out, slide out, unfold, etc., so that the sound waves are more efficiently directed.

In one embodiment of the present invention, a wave-shaping assembly for enhancing audio quality in mobile electronic devices, comprising a tray configured to re-shape sound waves in a specific direction relative to a direction of propagation and a mobile electronic device, the tray having a surface along a length l, a width w, and a distal end having a lipped portion that has a height h that act together to perform the re-shape of sound waves relative to the direction of propagation, and one or more extension and retraction components configured to slide the tray to one or more use positions at a distance d from a port comprised of one or both of a speaker configured on the mobile electronic device, so that the tray is extendable to the distance d when extended to the one or more use positions to extend outward from the port of the mobile electronic device, and is flush with a surface of the mobile electronic device when retracted to a storage position.

In another embodiment of the present invention, a method of shaping sound waves emitted by or captured by a mobile electronic device comprises extending a slidable tray to one or more use positions when sound waves are emitted from a port on a mobile electronic device and when sound waves are directed to the port on the mobile electronic device, to re-direct the sound waves in a specific direction relative to a direction of propagation and a mobile electronic device, the port including one or more a speaker port and a microphone port, the slidable tray having a surface along a length l, a width w, and a distal end having a lipped portion that has a height h upon which the sound waves are re-directed, and retracting the slidable tray to a storage position after use with either of the speaker and the microphone, so that the slidable tray is extendable to a distance d when extended to the one or more use positions to extend outward from the port of the mobile electronic device, and is flush with a surface of the mobile electronic device when retracted to the storage position.

In yet another embodiment of the present invention, a wave-shaping device comprises a retractable assembly having a slidable tray, a lipped portion on a distal end of the tray, and one or more components configured to extend the tray to one or more use positions and return the tray to a storage position flush with a surface of a mobile electronic device, the retractable assembly configured to produce a desired frequency responses from a speaker when the retractable assembly is in the one or more use positions, by angularly reflecting sound waves upwards off of a refracting surface on both the slidable tray and the lipped portion in an angular direction relative the direction of propagation, and one or more openings in the lipped portion to allow sound to propagate at least when the slidable assembly is in the stored position.

Other objects, embodiments, features and advantages of the present invention will become apparent from the following description of the embodiments, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

FIG. 1 is front view of a mobile electronic device having a wave-shaping assembly coupled thereto, according to one embodiment of the present invention;

FIG. 2 is a bottom view of mobile electronic device having a wave-shaping assembly coupled thereto, according to the embodiment of FIG. 1;

FIG. 3 is a rear view of a mobile electronic device having a wave-shaping assembly coupled thereto, according to the embodiment of FIG. 1;

FIG. 4 is a side view of a mobile electronic device having a wave-shaping assembly coupled thereto, according to the embodiment of FIG. 1;

DETAILED DESCRIPTION OF THE INVENTION

Figure 5:
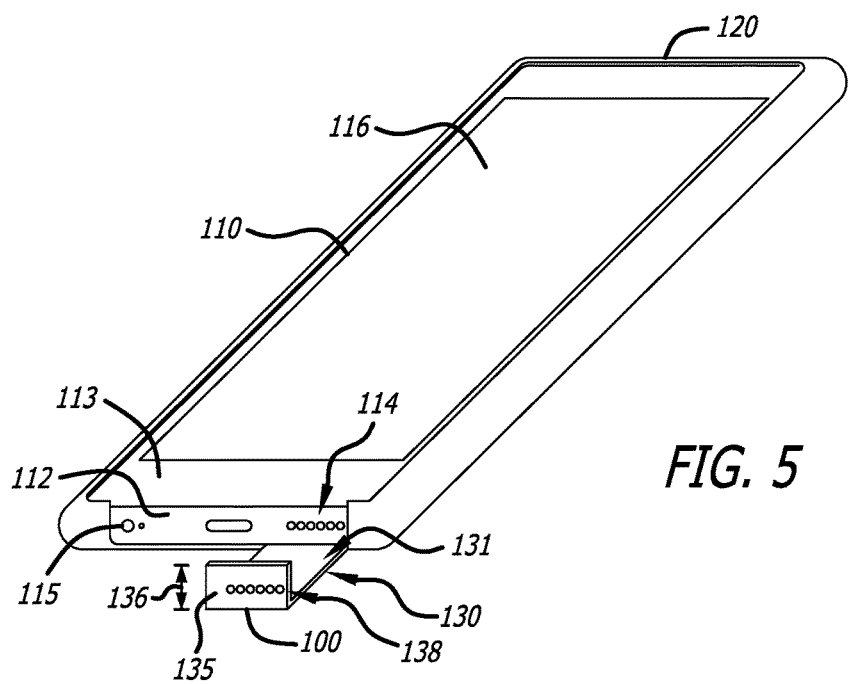
FIG. 5 is a perspective view of a mobile electronic device having a wave-shaping assembly coupled thereto, according to the embodiment of FIG. 1.

In the following description of the present invention reference is made to the exemplary embodiments illustrating the principles of the present invention and how it is practiced. Other embodiments will be utilized to practice the present invention and structural and functional changes will be made thereto without departing from the scope of the present invention.

FIG. 1 is a front view of a mobile electronic device 110, on which a wave-shaping assembly 100 according to one embodiment of the present invention is configured. FIG. 2 is a bottom view of such a mobile electronic device 110, showing an opening 112 at the location of a speaker 114 in the general area of where the wave-shaping assembly 100 is coupled to and configured with the mobile electronic device 110. FIG. 3 is a rear view of the mobile electronic device 110, and FIG. 4 is a side view. Each of FIG. 1, FIG. 3, and FIG. 4 show the wave-shaping assembly 100 extended to a certain distance d 132 from a base portion 111 of an enclosure 113 that houses the mobile electronic device 110.

In the embodiment of the present invention shown in FIG. 1-5, the wave-shaping assembly 100 is configured as a slide-out apparatus 130 that amplifies sound emitted by the speaker 114 on the mobile electronic device 110 by re-directing sound waves from a normal direction of propagation. The slide-out apparatus 130 is extendable from a storage position to one or more use positions by a listener, who manipulates a portion of the assembly 100 to extend the slide-apparatus 130 to a distance d 132 to the desired use position. Multiple use positions are possible, and limited only by the distance d 132 that the slide-out apparatus 130 is capable of extending to.

The slide-out apparatus 130 may be formed as part of a case 120 for housing the mobile electronic device 110, or may be formed as part of the enclosure 113 of the mobile electronic device 110 itself. FIG. 5 is a perspective view of a mobile electronic device 110, showing the case 120 and the wave-shaping assembly 100 as a slide-out apparatus 130.

In the embodiment of FIG. 1-5, one or more extension and retraction components comprise the assembly 100, which enable manipulation from a storage position to the one or more use positions and back again. These may at least include a tray 131 and a distal end portion 134. The slide-out apparatus 130 may be configured with a plurality of holes 138 on the distal end portion 134 of a tray 131, which allow sound to be emitted from the mobile electronic device 110 when the slide-out apparatus 130 is not extended away from the opening 112 in the mobile electronic device 110.

Regardless, the slide-out apparatus 130 may be configured so that the storage position (in which the tray 131 is retracted) is to position that is flush with, or substantially flush with, a surf136ace of the mobile electronic device 110 or the case 120. The extension and retraction components elongate the slide-out apparatus 130 (and tray 131, if included) up to a length l 133 of the tray 131 which extends to the distal end 134. The distal end 134 is comprised of a raised end portion 135 which has a height h 136. The width w 137 of the slide-out apparatus 130, which is the same as that of the distal end 134, may be any length sufficient to perform the amplification function for low-frequency and high-frequency content that is described herein.

Sound is re-directed in a specific direction relative to a direction of propagation away from a mobile electronic device 110 by the wave-shaping assembly 100 in several possible ways. Waves are re-shaped by reflecting off of the surface of the tray 131, distal end 134, and lipped or raised portion 135, and one or more of the distance d 132, the height h 136, and an angle formed between the tray 131 and the distal end 134. In other words, the angular configuration of the tray 131 and the distal end 134, together with the values for d 132, and h 136, may dictate, at least in part, in what specific direction sound waves are re-shaped and how they are enhanced vis-a-vis the listener.

The extension and retraction components may include one or more joints or other mechanisms about which the various components of the slide-out apparatus 130 are able to operate relative to each other, to slide, rotate, turn, spin, or otherwise move to reach the storage position and one or more use positions. The slide-out apparatus 130 may also operate along a track that is recessed inside the mobile electronic device 110 (or case or accessory/attachment, depending on the configuration), so that the tray 131 can be extended from, and retracted back into, the mobile electronic device 110. The track may include grooves, in which corresponding portions of the tray 131 are capable of being securely held, that correspond to the storage position and the one or more use positions. The slide-out apparatus 130 may "click" into place in either of the storage position or one or more use positions, to ensure that the listener understands that such a position has been reached. The tray 131 (and/or the internal cavity in which the track is formed) may be curved, parabolic, or otherwise shaped so as to be similar to that of the curvature of the mobile electronic device 110.

The wave-shaping assembly 100 may be designed so that a listener may utilize the tray 131 of the slide-out apparatus 130 as a stand, for example to allow the mobile electronic device 110 to be positioned freely on a desk, as would a picture frame. The present invention may therefore be multi-purpose and provide several benefits to the listener.

In most mobile electronic devices 110, sound is ported out a small opening 112 (or small port 112), usually from the either the bottom or the side of the enclosure 113, similar to as seen in FIG. 2. Placement of the speaker 114 inside the mobile electronic device 110 is proximate to this port 112, with a short ducting used to conduct the sound out. This small port 112, although attractive from an industrial design perspective, is not optimal for producing loud, intelligible, and quality audio. In conventional or existing designs of mobile electronic devices 110, the primary reasons for reduced audio quality are that the transducer itself is designed as small as possible, and the opening 112 is also kept as small as possible.

A small transducer is desirable in order to achieve a thin, lightweight design for the mobile electronic device 110. This includes both the overall diameter and the thickness of the speaker 114. In general, given two speakers with otherwise similar construction, the larger diameter speaker will produce better low-frequency audio. There are many signal processing techniques to help a smaller speaker sound bigger than it is, but these have only finite improvement. Furthermore, audio improvement by signal processing is not as effective at louder audio output levels. This is due to the intrinsic need to protect the speaker 114 itself from damage over time due to over excursion and too much power.

Another way in which this smaller speaker limits audio output is in its thinness. When a speaker is made thinner, the limits of its travel, known as $X_{MAX}$, are reduced accordingly. In other words, if a speaker is only 2 mm thick, the speaker diaphragm is limited to excursions much less than the 2 mm overall thickness. This is another area where signal processing to improve audio quality can damage the speaker if not implemented properly.

Figure 6:
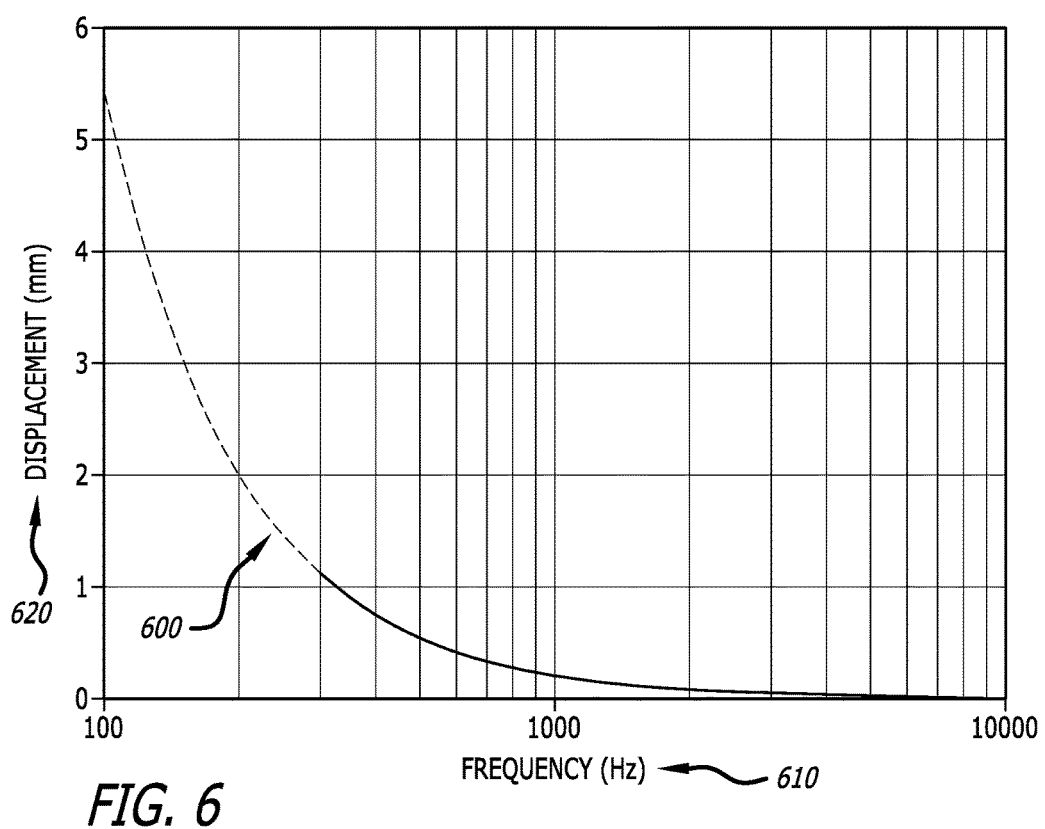
FIG. 6 is a graphical representation of a loudspeaker displacement as a function of frequency.

FIG. 6 is a graphical representation of a loudspeaker displacement as a function of frequency. The plot 600 of FIG. 6 represents peak-to-peak displacement 620 of a speaker 114 as a function of frequency 610, and indicates that as frequency 610 increases as displacement 620, or distance from a sound source, decreases. At higher frequencies 610, the speaker cone moves very little, but the speaker displacement 620 increases geometrically with lower frequencies 610. The plot 600 shows a solid line for areas where the speaker 114 is working well as a linear transducer of sound. When the speaker excursion exceeds the limits of linear excursion, loudness suffers as the effective waveform is compressed. As the speaker 114 is driven even further, the voice coil of the speaker, in moving back and forth, may actually hit the frame of the speaker, bending the voice coil. If the voice coil is bent, the speaker may begin to make an audible scratching sound which is very undesirable. This scratching sound is the wires of the voice coil scraping against the speaker's frame. This often leads to total failure of the speaker 114. From this it can be deduced that over-excursion of the speaker is highly undesirable, and thus other means are needed to improve the effective sound quality of a mobile electronic device 110.

The sound port of a mobile device 110 usually on the side or bottom edge of the enclosure 113, and is usually kept as small as possible for a neat and visually-appealing appearance. However, these locations are also not optimal for sound transmission, and the reduced diameter port attenuates low frequency response.

The smaller port size also reduces the directionality of the audio at lower frequencies. The low-frequency signal is omni-directional, radiating in all directions in a spherical pattern. High-frequency content is directional, generally, the closer the listener is to the normal vector emanating from the port, the louder and clearer the high frequency will sound. As the listener moves off axis, there is an easily discernible reduction in high frequency content.

The invention addresses both of these major shortcomings. By creating an extension out from either the side or end of the mobile electronic device 110, it increases the effective diameter of the port and speaker, improving low frequency response. Furthermore, the height h of the upturned distal end 134 of the extension re-directs the high frequency content upwards toward the listener, providing a louder and clearer signal.

Figure 7:
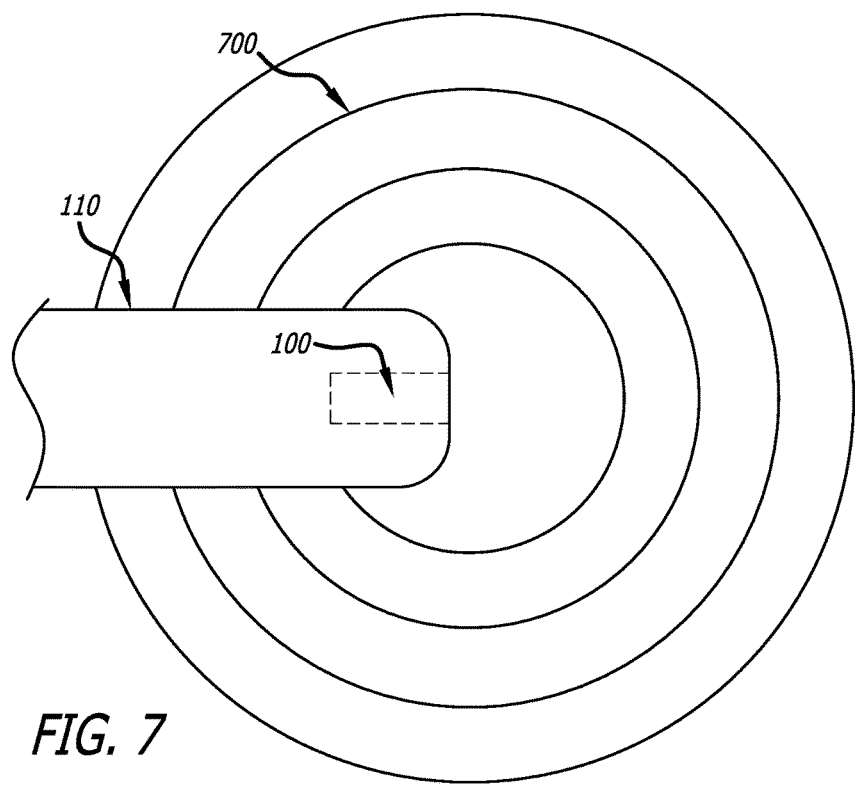
FIG. 7 is a diagram of sound wave propagation for low-frequency content from a mobile electronic device.
Figure 8:
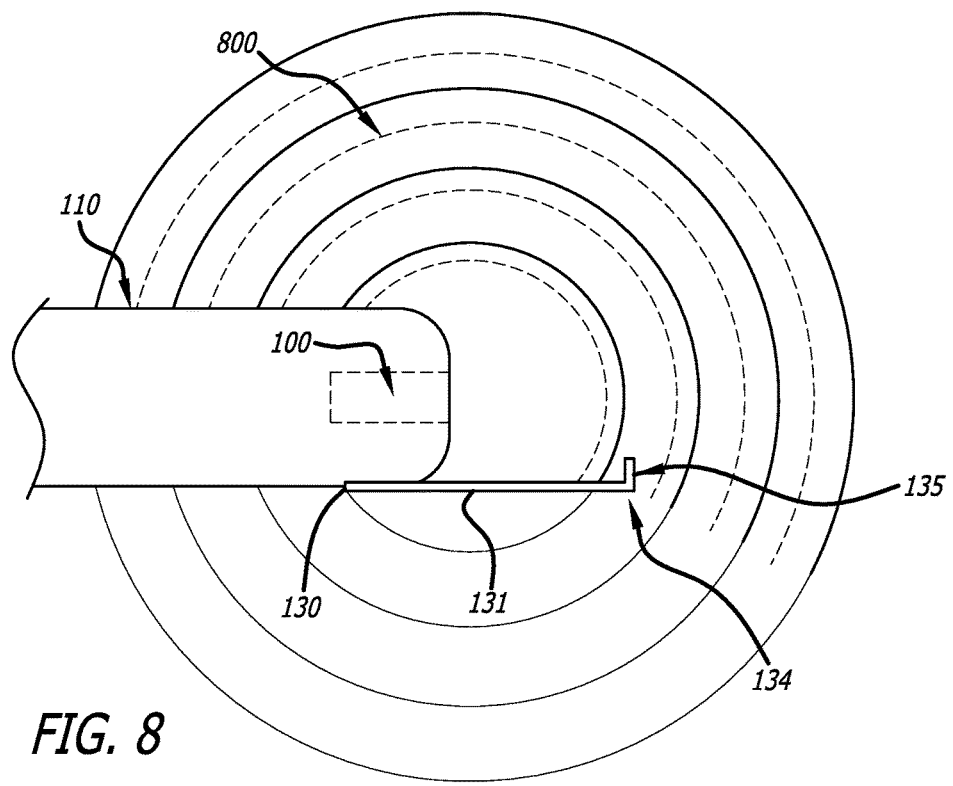
FIG. 8 is a diagram of sound wave propagation for low-frequency content from a mobile electronic device having a wave-shaping assembly coupled thereto.

FIG. 7 is an illustration of general low-frequency audio performance, while FIG. 8 is an illustration of low-frequency audio performance 700 with a wave-shaping assembly 100 according to the present invention. These figures show audio performance where a listener is in the near vicinity to a speaker 114 on a mobile electronic device 110, for example when speaking on a telephone. In FIG. 7, an example is shown in relation to a mobile electronic device having a typical small audio port along the bottom of the enclosure. Numeral 3 indicates low-frequency audio radiating in an omni-directional pattern from this small audio port.

In FIG. 8, an example is shown in which a mobile electronic device 110 is configured with a wave-shaping assembly 100 and a slide-out apparatus 130. Low-frequency audio 800 is concentrated towards a listener by the wave-shaping assembly 100. The slide-out apparatus 130 has, as noted above, a distal end 134 comprised a raised end portion 135 which has a height h 136. That height h 136 helps to guide the sound waves emanating from the speaker 114 towards a listener.

FIG. 7 and FIG. 8 when considered together, and as noted above, examine the low-frequency enhancement provided by the present invention. FIG. 7 shows the end of a mobile electronic device 110, radiating low frequency content in an omni-directional pattern. Signal strength experienced by the listener at any equidistant position from the device 110 follows the inverse square law, that is:

$$\text{Intensity} = P_{OUT}/4\pi r2$$

Where intensity is the perceived volume, $P_{OUT}$ is the output power of the speaker, and r is the distance from the mobile electronic device 110 to the listener. Obviously only a fraction of the transmitted signal power reaches the listener, and this is one of the main reasons why mobile electronic devices 110 are assumed to have poor low-frequency audio performance.

With the wave shaping assembly 100 of the present invention extended, however, there is a significant improvement in perceived low-frequency response. Much of the audio energy previously broadcast downwards, away from the listener, is now directed upwards towards the listener. This is primarily due to the wave shaping assembly 100 obscuring part of the radiating sphere, forcing the audio energy into the path of least resistance.

For high-frequency content, the effect is slightly different. The high-frequency wave is directional, and most of its energy is concentrated on a narrow axis normal to the speaker port. This axis is usually not directed towards the listener, and the high frequency audio performance suffers.

Figure 9:
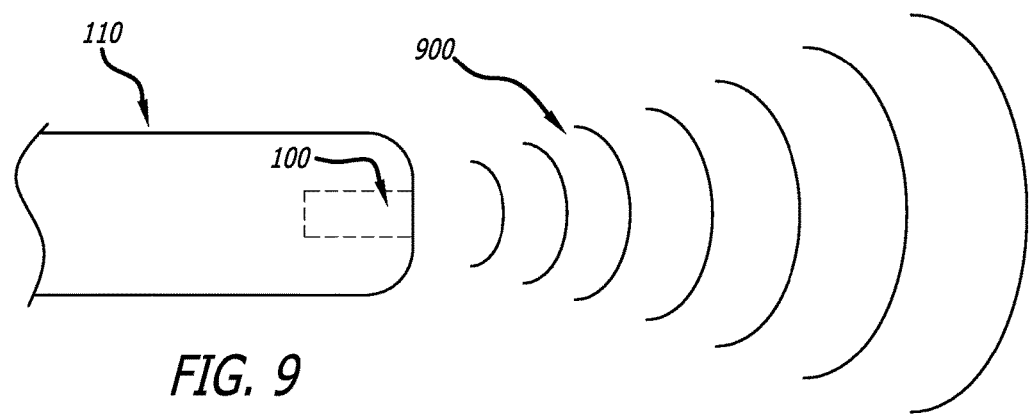
FIG. 9 is a diagram of sound wave propagation for high-frequency content from a mobile electronic device.
Figure 10:
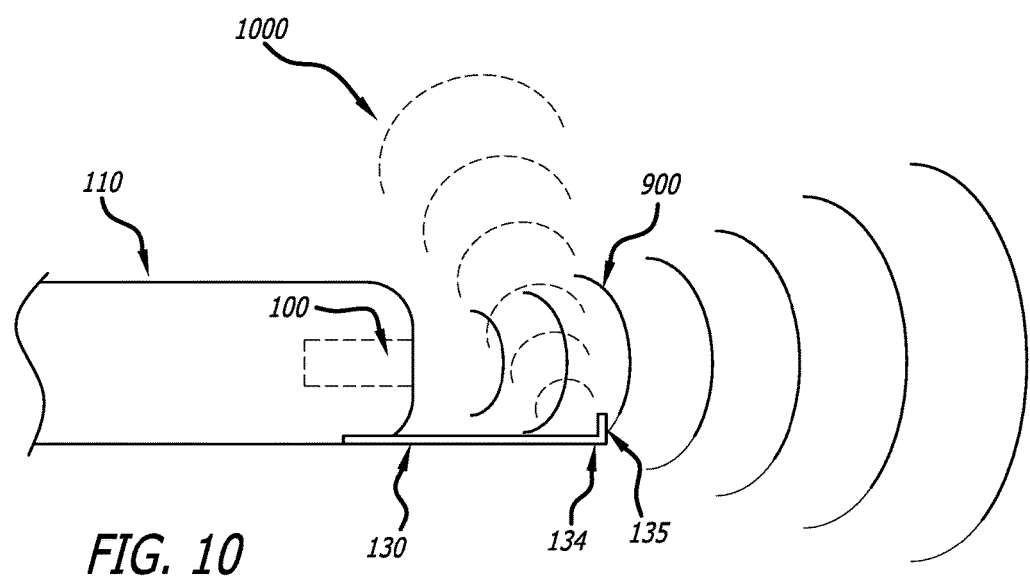
FIG. 10 is a diagram of sound wave propagation for high-frequency content from a mobile electronic device having a wave-shaping assembly coupled thereto.

FIG. 9 is an illustration of general high-frequency audio performance 900, while FIG. 10 is an illustration of high-frequency audio performance 1000 with a wave-shaping assembly 100 according to the present invention. These figures show audio performance where a listener is far from a speaker 114 on a mobile electronic device 110, for example when watching a video clip or listening to music. In FIG. 9, sound waves are shown in relation to a mobile electronic device 110 having a typical small audio port along the bottom of the enclosure. Numeral 12 indicates high-frequency audio radiating in a directional pattern y away from the mobile electronic device 110.

In FIG. 10, the mobile electronic device 110 is configured with a wave-shaping assembly 100 and a slide-out apparatus 130. High-frequency audio is reflected towards the listener the wave-shaping assembly 100. As in FIG. 8, the distal end 134 of the slide-out apparatus 130 has a raised end portion 135 which has a height h 136. That height h 136 helps to guide the sound waves in a different directional pattern z.

With the wave shaping assembly 100 of the present invention extended, however, there is a significant improvement in perceived high-frequency response. Some of the audio energy previously broadcast straight down the axis, away from the listener, is now reflected upwards towards the listener. This is primarily due to the wave-shaping assembly 100 providing a refracting surface for the directional high frequency audio.

The sizing and shape of the wave-shaping assembly 100 are key to its sonic improvements. For low-frequency content improvements, benefits are seen at only a few millimeters, and improve linearly with increases in area. The slide-out extension 130 may be as wide as the port, but improves further if increased wider.

For high-frequency content improvement the wave-shaping assembly 100 should be closer to the port so as to intercept more of the transmitted audio. The height of the reflecting surface is usually limited to about 6 mm, depending on the type and size of mobile electronic device 110. If the height is minimal and the extension is moved farther away, the high-frequency improvements may be diminished. Therefore, as the wave-shaping assembly 100 is intended to improve both high-frequency and low-frequency audio, the optimal size varies depending on both the objectives of improvement and the intrinsic performance of the mobile audio device without the slide-out extension.

As noted above, the wave-shaping assembly 100 may also be configured to enhance the operation of a microphone 115 on a mobile electronic device 110. Sound waves directed at the microphone 115 may be more easily captured using, for example, the slide-out extension 130 of the present invention. It should be noted, however, that any of the embodiments for configuration of the wave-shaping assembly 100 may also be used for enhancing operation of a microphone 115.

It should further be noted that depending on the design of a mobile electronic device 110, speakers 114 and microphones 115 may be located in completely different places on the device 110 itself. Therefore it is contemplated that the wave-shaping assembly 100 may be a multi-functioning component for both sound emitted by speakers 114 and sound captured by microphones 115 (where the speaker 114 and microphone 115 are near each other), and alternatively, may have different slide-out or channel components (such as the divided channel described below) for each of the speaker 114 and microphone 115. Furthermore, more than one wave-shaping assembly 100 may be included.

Figure 11:
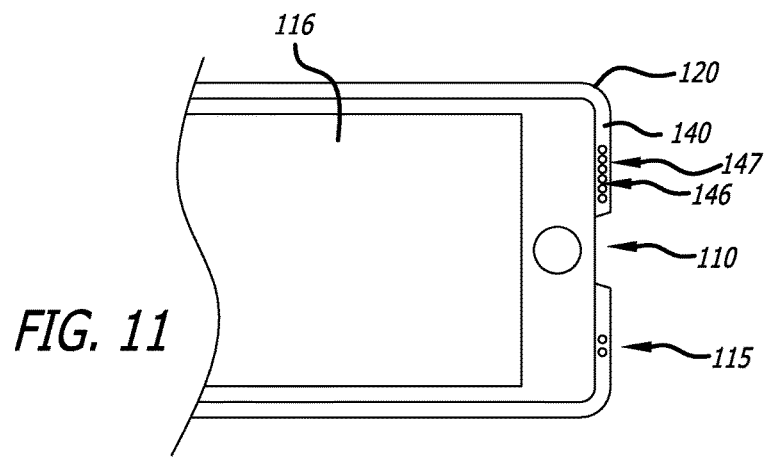
FIG. 11 is a partial overhead view of a mobile electronic device having a wave-shaping assembly coupled thereto, according to another embodiment of the present invention.
Figure 12:
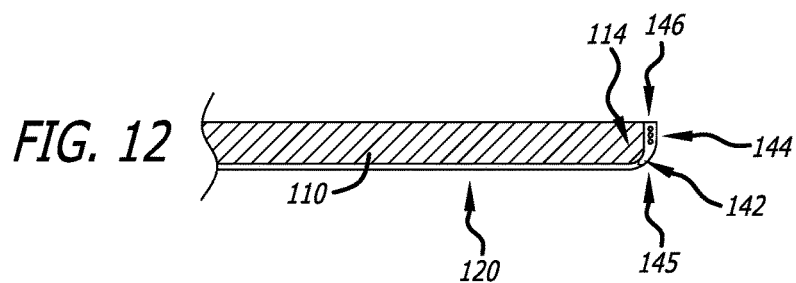
FIG. 12 is a partial side view of a mobile electronic device having a wave-shaping assembly coupled thereto, according to the embodiment of FIG. 11.
Figure 13:
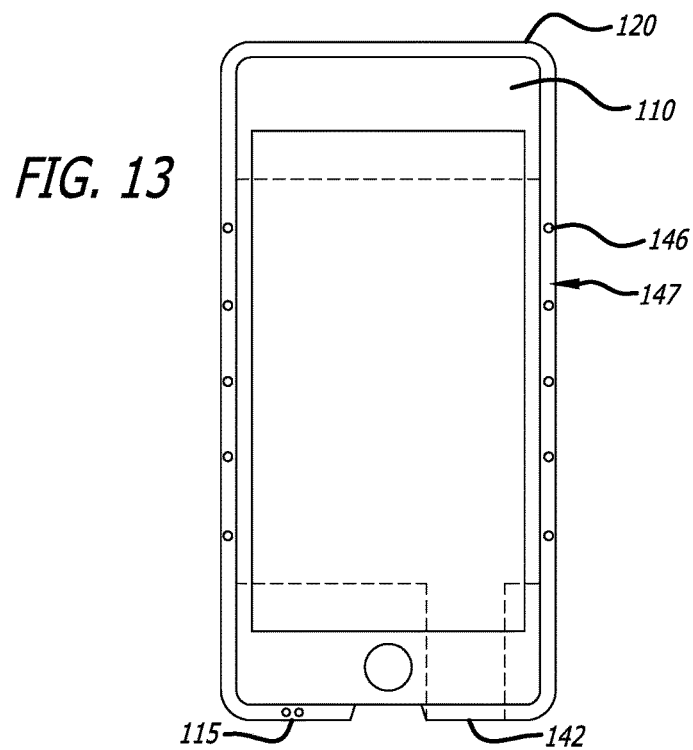
FIG. 13 is a front view of a mobile electronic device having a wave-shaping assembly coupled thereto, according to the embodiment of FIG. 11.

FIG. 11, FIG. 12, and FIG. 13 are front and side views of a mobile electronic device 110 according another embodiment of the present invention. In this embodiment, the wave-shaping assembly 100 is a permanent portion of either the enclosure 113 of the mobile electronic device 100, or a portion of the case 120 used to house the mobile electronic device 110. In this embodiment, there is no actual movement of the components of the wave-shaping assembly 110. The assembly 100 includes a cavity 140 comprised of an inner channel or tunnel 142, which has a curvature 144 which curves in a desired direction and at a desired degree (configured, in one aspect, at the time of manufacturing) to enhance the sound directed to the listener.

In this embodiment comprising a permanently-configured cavity 140 design that includes a channel or tunnel 142, it may considered as a case 120 that is permanently extended at or near where a speaker 114 is configured on the mobile electronic device 110. Internally, the wave-shaping assembly 100 is a hollow, curved channel 142 that direct sound to the front of the device 110 so that sound is channeled to the bottom or directly below the speaker 114 and curving up. This extension on the actual case 120 is very minimal and the same would be extended in front of the microphone 115.

FIG. 11 and FIG. 12 are partial front and side views, respectively, of a mobile electronic device 110 having a wave-shaping assembly 100 according to this embodiment. In FIG. 11, the case 120 includes a plurality of openings, or holes, 146, through which sound travels when emitted by a speaker 114 and a microphone 115. The case 120 may therefore have an outer surface 147 in which these holes 146 are configured, so as to enclose the channel or tunnel 142. FIG. 12 shows a plurality of arrows 145 which indicate direction of sound waves emitted by the speaker 114 or microphone 115 through the channel 142 in the cavity 140. The curvature 144 of the case 120 directs the sound waves along the direction of these arrows 145 and out of the holes 146.

In other configurations of this permanent cavity embodiment, one or more channels 142 may be extended and divided to two tunnels, channels, cavities, or other open spaces 142, one on each side of a screen 116 on the mobile electronic device 110. In other words, the case 120 or enclosure 113 may be designed in such way to completely block the front of the speaker 114 on the mobile electronic device 110. However, sound waves are re-directed back underneath the device 110 through a very thin channel 142, out to openings on the sides of the device 110. FIG. 13 shows this configuration, in which the plurality of holes 146 are positioned on sides of the mobile electronic device 110. The speaker 114 itself (and microphone 115 itself) may be positioned on the bottom, side, or any other position on the mobile electronic device 110; the present invention is designed to re-direct the sound emitted from the speaker 114 (and/or directed to the microphone 115) along the sides of the mobile electronic device 110 to amplify it be directed sound out of both sides.

The cavity 140 may be very short and curved directly in front of the speaker 114 and the microphone 115 of the mobile electronic device 110. In this configuration, the cavity 140 is simply re-directing sound up towards the screen 116 and the listener. If a microphone 115 is used, the cavity 140 is collecting sound and redirecting it back to the device 110. Regardless, in a microphone configuration, sound is to be collected and directed in the shortest distance back to the microphone 115.

In a further embodiment of the present invention, the wave-shaping assembly 100 is an accessory which includes one or more attachments configured to direct sound waves emanating from a mobile electronic device 110. The accessory may be configured as part of a case 120, within which the mobile electronic device 110 is positionable, or may be a separate add-on accessory that works with any case 120 and any device 110. This accessory may further include several additional and modular components that are capable of being added or subtracted from a device 110, such as actual speakers. Accordingly, the present invention may be include as part of an actual device 110, or may be an accessory or accessories for use with any device 110.

A case 120 for use with a mobile electronic device 110 may be made from a moldable material, for example silicone. In an embodiment where the case 120 is made of such a moldable material, and the wave-shaping assembly 100 is part of the case 120, the present invention may include a feature where the cavity 140 may be pushed or manipulated into a desired form. This may be done at the time of manufacture to match a particular mobile electronic device 110, or it may performed by the listener, so that sound quality can be enhanced as needed for the device 110, or even for the specific audio being listened to. This may be done, for example, by a creating a semi, mini-bowl shape underneath the speaker 114 or microphone 115 area to further enhance the quality and direction of the sound. The wave-shaping assembly 100 may therefore be molded or pre-formed, or may be moldable by the listener.

It is therefore to be understood that the configuration of the wave-shaping assembly 100 and the slide-out extension 130, may take many forms. As noted, the assembly 100 may comprise a slidable mechanism that allows extension and retraction of a tray 131. This sliding mechanism may "pop" out or in so as to movable into a desired position, Depending on the embodiment thereof, the wave-shaping assembly 100 may also be unfolded, bent, formed, spun, flipped, rotated, extended, expanded, or attached/detached to accomplished the objective of re-directing sound emitted by the mobile electronic device 110.

Therefore, it is to be understood that the present invention may comprise any type of extension for directing audio waves, and may be permanent, temporary, movable, moldable, removable, attachable, expandable, or a combination of some or all of these. Furthermore, the present invention may be comprised of any material that allows for improvements in sound quality in the various embodiments described herein. For example, the present invention may include polymers, plastics, metals, composite materials, or any combination thereof.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of any claim herein are set forth below in a certain combination, it must be expressly understood that the invention includes other combinations of fewer, more or different elements, which are disclosed in above even when not initially or eventually claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in any claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A wave-shaping assembly for enhancing audio quality in mobile electronic devices, comprising:
   a tray configured to re-shape sound waves in a specific direction relative to a direction of propagation and a mobile electronic device, the tray having a surface along a length l, a width w, and a distal end having a lipped portion that has a height h that act together to perform the re-shape of sound waves relative to the direction of propagation; and
   one or more extension and retraction components configured to slide the tray to one or more use positions at a distance d from a port comprised of one or both of a speaker configured on the mobile electronic device,
   so that the tray is extendable to the distance d when extended to the one or more use positions to extend outward from the port of the mobile electronic device, and is flush with a surface of the mobile electronic device when retracted to a storage position.

2. The wave-shaping assembly of claim 1, wherein the specific direction relative to a direction of propagation away from a mobile electronic device is determined by the distance d of the tray, the height h of the lipped portion, and an angle formed between the tray and the distal end.

3. The wave-shaping assembly of claim 1, wherein the specific direction is a direction of a microphone for sound waves communicated to the mobile electronic device, and wherein the specific direction is a direction away from the speaker for sound waves communicated from the mobile electronic device.

4. The wave-shaping assembly of claim 1, further comprising at least one opening in the lipped portion of the distal end.

5. The wave-shaping assembly of claim 1, wherein at least one of the tray and the lipped portion has a curved surface.

6. The wave-shaping assembly of claim 1, wherein at least one of the tray and the lipped portion has a parabolic surface.

7. The wave-shaping assembly of claim 1, wherein at least one of the lipped portion and the tray has a curvature substantially the same as a curvature of the surface of the mobile electronic device.

8. A method of shaping sound waves emitted by or captured by a mobile electronic device, comprising:
   extending a slidable tray to one or more use positions when sound waves are emitted from a port on a mobile electronic device and when sound waves are directed to the port on the mobile electronic device, to re-direct the sound waves in a specific direction relative to a direction of propagation and a mobile electronic device, the port including one or more a speaker port and a microphone port, the slidable tray having a surface along a length l, a width w, and a distal end having a lipped portion that has a height h upon which the sound waves are re-directed; and
   retracting the slidable tray to a storage position after use with either of the speaker and the microphone,
   so that the slidable tray is extendable to a distance d when extended to the one or more use positions to extend outward from the port of the mobile electronic device, and is flush with a surface of the mobile electronic device when retracted to the storage position.

9. The method of claim 8, wherein the specific direction relative to a direction of propagation from the port mobile electronic device is determined by the distance d of the tray, the height h of the lipped portion, and an angle formed between the tray and the distal end.

10. The method of claim 8, wherein the specific direction is a direction of a microphone for sound waves communicated to the port on the mobile electronic device, and wherein the specific direction is a direction away from the speaker for sound waves by the port on the mobile electronic device.

11. The method of claim 8, further comprising at least one opening in the lipped portion of the distal end, wherein sound is directed out of and into the port through the at least one opening.

12. The method of claim 8, wherein at least one of the slidable tray and the lipped portion has a curved surface.

13. The method of claim 8, wherein at least one of the slidable tray and the lipped portion has a parabolic surface.

14. The method of claim 8, wherein at least one of the lipped portion and the slidable tray has a curvature substantially the same as a curvature of the surface of the mobile electronic device.

15. A wave-shaping device, comprising:
   a retractable assembly having a slidable tray, a lipped portion on a distal end of the tray, and one or more components configured to extend the tray to one or more use positions and return the tray to a storage position flush with a surface of a mobile electronic device, the retractable assembly configured to produce a desired frequency responses from a speaker when the retractable assembly is in the one or more use positions, by angularly reflecting sound waves upwards off of a refracting surface on both the slidable tray and the lipped portion in an angular direction relative the direction of propagation; and
   one or more openings in the lipped portion to allow sound to propagate at least when the slidable assembly is in the stored position.

16. The wave-shaping device of claim 15, wherein the tray has a length l and a width w, the lipped portion has a height h, and the tray is extendable to a distance d, the sound waves reflected at least due to an angle formed between the slidable tray and the distal end, the height h, and the distance d.

17. The wave-shaping device of claim 15, wherein at least one of the slidable tray and the lipped portion has a curved surface.

18. The wave-shaping device of claim 15, wherein at least one of the slidable tray and the lipped portion has a parabolic surface.

19. The wave-shaping device of claim 15, wherein at least one of the slidable tray and the lipped portion has a curvature substantially the same as a curvature of the surface of the mobile electronic device.

20. The wave-shaping device of claim 15, wherein the mobile electronic device has a port comprised of the speaker and a microphone, and wherein the retractable assembly reflects sound waves emitted by the speaker, and directs sound waves to the microphone.

* * * * *